June 18, 1940.  F. G. FOLBERTH ET AL  2,204,672
AUTOMOTIVE VEHICLE CONTROL MECHANISM
Filed March 12, 1931  3 Sheets-Sheet 1

Inventors
FREDERICK G. FOLBERTH
& WILLIAM M. FOLBERTH
By Richey & Watts
Attorneys June 18, 1940.  F. G. FOLBERTH ET AL  2,204,672
AUTOMOTIVE VEHICLE CONTROL MECHANISM
Filed March 12, 1931  3 Sheets-Sheet 2
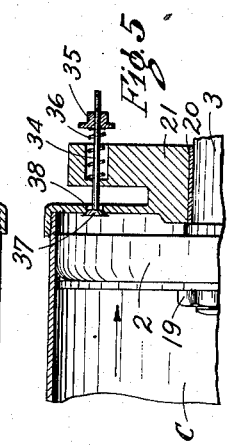
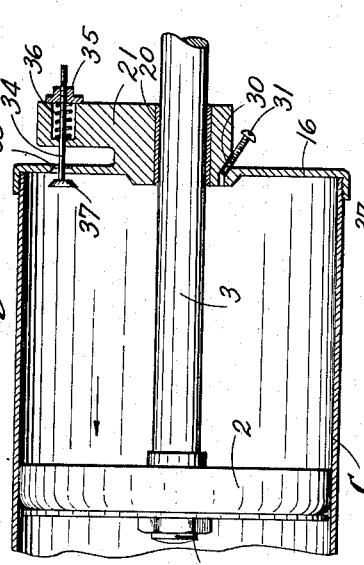
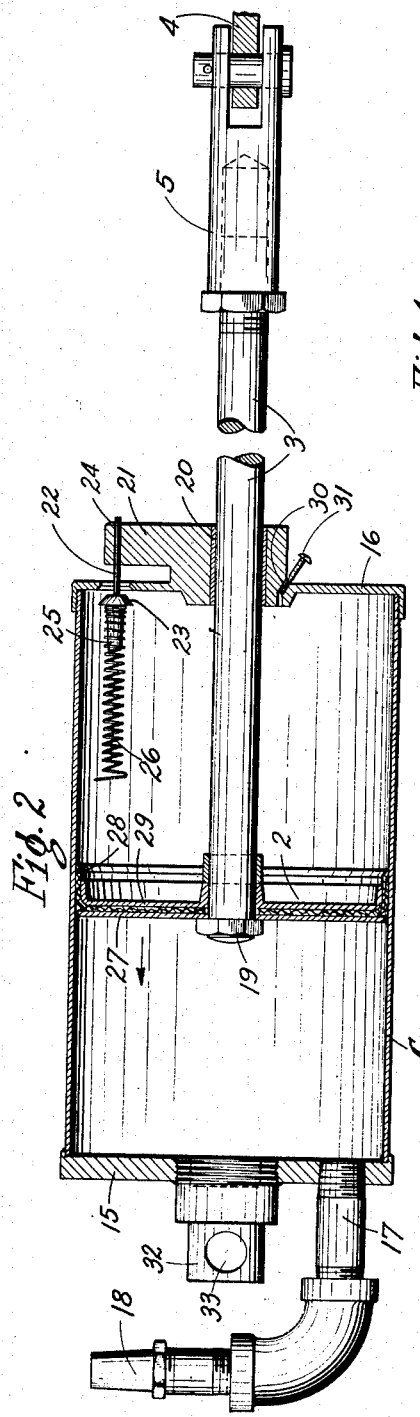
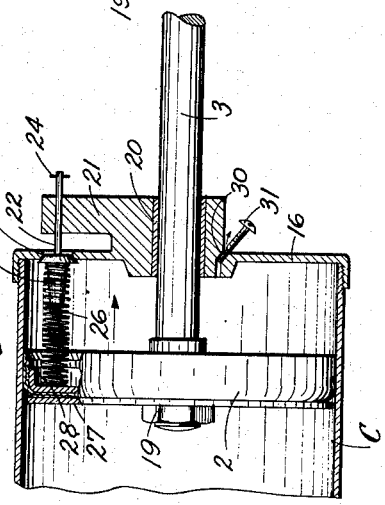
Inventors
FREDERICK G. FOLBERTH
& WILLIAM M. FOLBERTH
By Richey & Watts
Attorneys

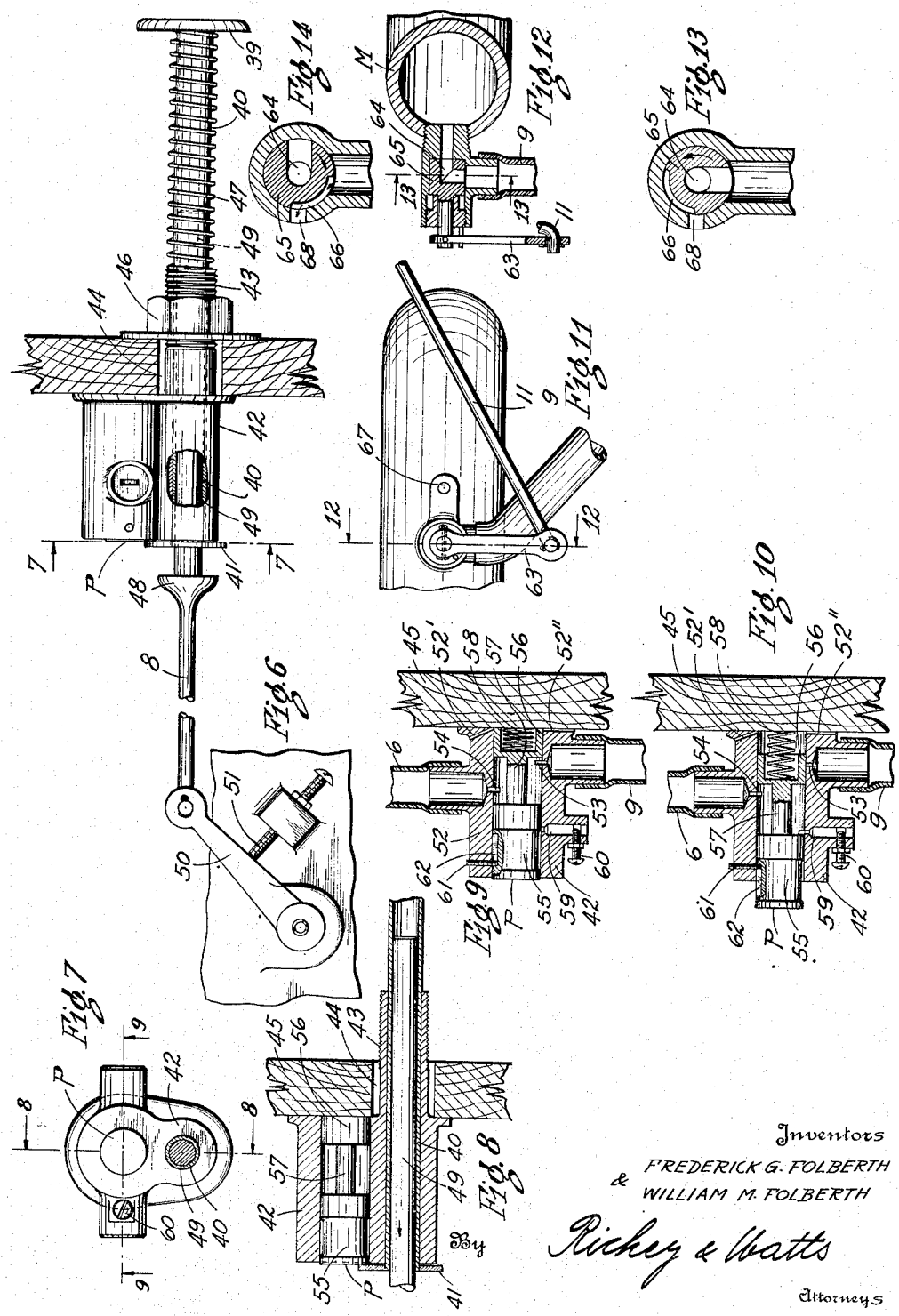

Patented June 18, 1940

2,204,672

UNITED STATES PATENT OFFICE 2,204,672

AUTOMOTIVE VEHICLE CONTROL MECHANISM

Frederick G. Folberth and William M. Folberth, Cleveland, Ohio

Application March 12, 1931, Serial No. 522,182

2 Claims. (Cl. 192—.01)

This invention relates to control mechanism for automotive vehicles and more particularly to apparatus for facilitating the operation of the driving controls of automobiles.

In the ordinary operation and control of the standard type of automobile there are employed two foot-operated levers, a hand controlled gear shifting lever and a foot controlled accelerator. The driving of a vehicle having its control mechanism arranged in this manner necessitates the disengaging and engaging of the clutch of the vehicle by means of one of the foot operated levers. This disengaging and engaging is ordinarily done to permit shifting the gears from one speed to another and must be accompanied by proper manipulation of the accelerator which operates the vehicle engine throttle so that the speed of the engine will be properly controlled. A certain amount of skill is required to smoothly and efficiently operate the controls of an automobile and particularly the clutch pedal operating lever must be properly manipulated to prevent unpleasant grabbing and unnecessary wear and tear on the car.

Among the objects of our invention is the provision of apparatus which is adapted to be quickly and easily installed on any standard type of motor car, or which may be built into the car without appreciable change in design, and which will greatly facilitate the control of the vehicle and also reduce the operating cost and up-keep expense; the provision of means for co-ordinating the action of the vehicle clutch and accelerator whereby the foot operation of the clutch in shifting gears is eliminated; the provision of apparatus for co-ordinating the operation of the vehicle accelerator and clutch which greatly simplifies the control of the vehicle but which does not interfere in any way with the standard manual control of the vehicle; the provision of control apparatus for vehicles which will positively prevent improper engaging of the clutch thus eliminating uneven starting of the vehicle; the provision of apparatus which will permit a "free wheeling" effect to be obtained, at the will of the operator, with the standard vehicle transmission; the provision of an automatic clutch control and operating mechanism which is operated by the vacuum created in the intake manifold of the vehicle engine and which may be rendered completely inoperative when desired; the provision of fluid pressure actuated apparatus for operating the clutch of an automobile and means connected to the vehicle throttle operating mechanism for controlling the clutch operating mechanism.

The above and other objects of our invention will appear from the following description of a preferred form thereof, reference being had to the accompanying drawings.

Fig. 2 is a cross sectional view of the vacuum cylinder together with the piston and clutch operating connection;

Fig. 3 is a fragmentary view generally similar to Fig. 2 but illustrating the piston in a different position;

Fig. 4 illustrates a modified form of cylinder relief valve construction applied to an operating cylinder generally similar to that shown in Fig. 2;

Fig. 5 is a fragmentary view similar to Fig. 4 and illustrates the relief valve in its closed position;

Fig. 6 illustrates the control valve and the connection between the control valve and the accelerator;

Fig. 7 is an end view of the control valve taken on line 7—7 of Fig. 6;

Fig. 8 is a vertical longitudinal section through the valve and its actuating mechanism taken on line 8—8 of Fig. 7;

Fig. 9 is a horizontal section of the control valve taken on line 9—9 of Fig. 7 and illustrating the valve when in the position shown in Fig. 6. When the valve is in this position the clutch is disengaged;

Fig. 10 is a view generally similar to Fig. 9 except illustrating the valve in the position it is in when the clutch is engaged;

Fig. 11 is an enlarged detail view of a shut-off valve which may be used in the intake manifold connection;

Fig. 12 is a section taken on line 12—12 of Fig. 11;

Fig. 13 is a section taken on line 13—13 of Fig. 12;

Fig. 14 is a view similar to Fig. 13 but showing the shut-off valve in closed position.

Figure 1:
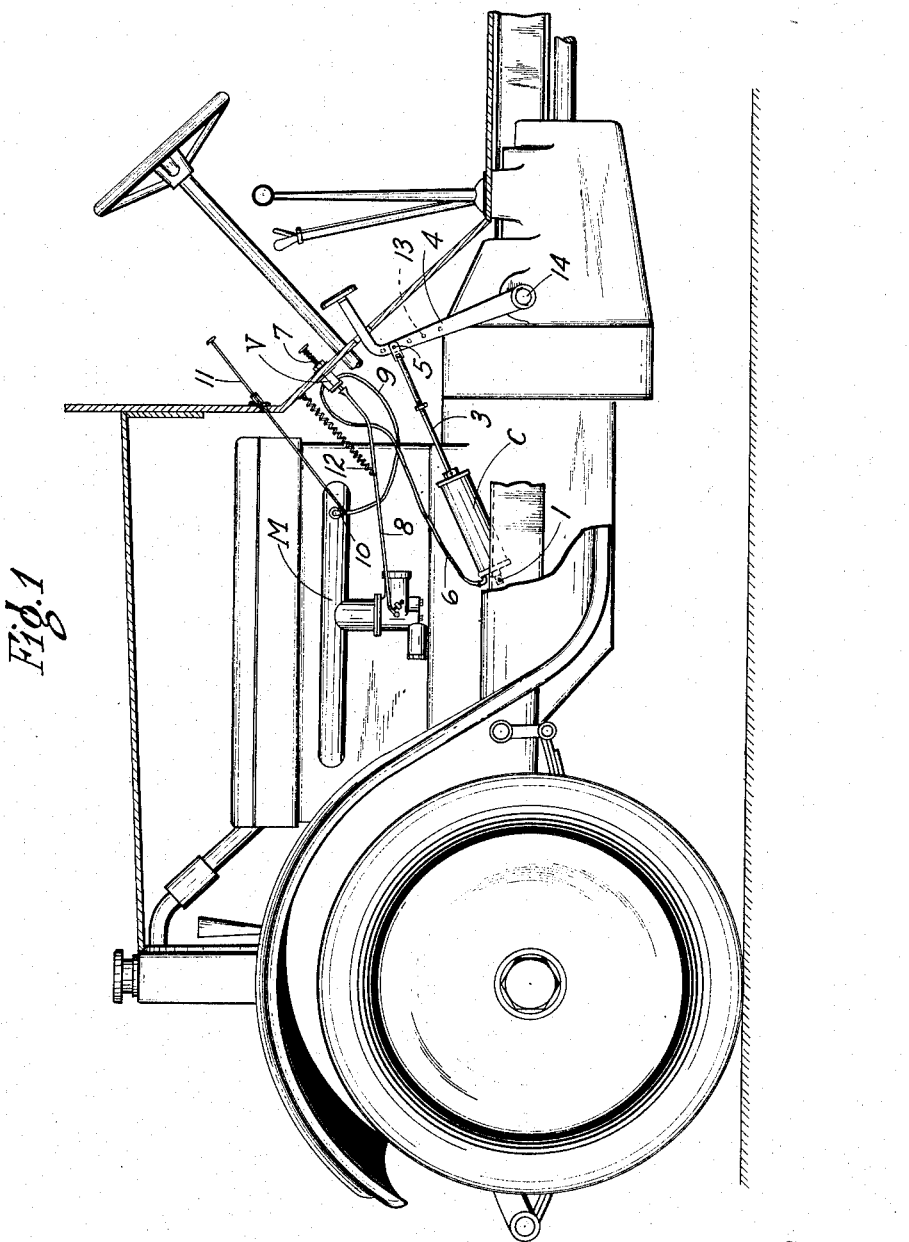
Fig. 1 is a fragmentary side elevation of an automobile illustrating the general layout of my control apparatus installed on the vehicle.

Referring now to Fig. 1 of the drawings the cylinder C is preferably pivotally mounted at its lower end to the frame of the vehicle as shown at 1 and contains a piston 2 which carries a piston rod 3 extending out through the upper end of the cylinder C and connected at its outer end to the clutch operating lever 4 by means of any suitable bracket such as that shown at 5. A fluid pressure conducting conduit 6, preferably rubber hose, copper tube, or the like, extends from the lower end of the cylinder C to the valve V which is secured to the floor board of the vehicle directly beneath the foot throttle operating plunger or accelerator 7. This foot plunger 7 is adapted to operate the rod 8 which is connected to operate the throttle valve in the carburetor. A fluid pressure conducting conduit 9 leads from the valve V and is connected to the intake manifold M through a shut-off valve 10. A control rod 11 may be connected to the shut-off valve 10 and extend up through the dash board of the vehicle to a position where it may be conveniently manipulated by the operator of the vehicle to open or close the valve 10. A tension spring 12 is secured at one end to the rod 8 and at its other end to the floor board of the car, or any other suitable point, and tends always to hold the throttle of the vehicle in its closed position, or idling motor speed.

As indicated at 13 a number of holes may be provided in the clutch operating lever 4. The object of such holes is to make it possible to secure the piston rod 3 to the clutch operating lever 4 in the desired position. The clutch springs and the pedal effort necessary to disengage the clutches of different automobiles vary considerably and by securing the piston rod 3 to the clutch lever 4 at the proper distance from its fulcrum point 14 it is possible to take care of a large range of clutches having different operating characteristics with only one size of cylinder C. It will be understood that the holes 13 need not all be drilled in the clutch lever but that ordinarily a single hole will be drilled at the proper point for the particular type of clutch in question.

The cylinder C is closed at both ends by cover plates 15 and 16. A pipe 17 leads from the suction end of the cylinder and carries a fitting 18 to which the fluid pressure conducting conduit 6 may be attached. Piston rod 3 is secured to the piston 2 by means of a nut 19 and has a bearing 20 in the end plate 16. This end plate 16 has a projecting leg portion 21 which may be drilled to accommodate the valve stem 22 of the relief valve 23. This valve stem 22 slides in the hole in the arm 21 and is prevented from opening too far by means of a pin 24 which is stopped by the arm 21 when the valve reaches its wide open position. The valve 23 carries a projecting lug 25 on its inner surface which lug 25 acts as a support for the relatively light coil spring 26, the function of which will be fully explained later.

The piston 2 is composed of a disc 27 of slightly smaller diameter than the inside of the cylinder and a cup-shaped leather sealing member 28 which is held in place by the cup-shaped retaining disc 29. This type of piston is well known and possesses the characteristics of forming a tight joint between the piston and the cylinder when fluid pressure is applied on the open side of the cup-shaped leather seal, and permitting the free passage of air past the piston when pressure is applied on the other side. Thus in applicants' construction when the greater pressure is applied to the right hand end of the cylinder (Fig. 2) the leather 28 will seal the joint between the cylinder and piston. When, on the other hand, the greater pressure is applied to the left hand end of the cylinder, air may pass freely past the piston from one side thereof to the other.

It will be understood that although we have specifically described and illustrated a cylinder and a piston operable therein any equivalent fluid pressure actuated apparatus, such as a flexible diaphragm supported in a suitable diaphragm chamber, could be utilized. We, therefore, do not wish to be limited to a cylinder and piston arrangement but intend the expression "cylinder and piston," wherever used in this specification and the appended claims, to include a diaphragm and diaphragm chamber or other equivalent apparatus adapted to be operated by fluid pressure.

A small adjustable vent hole 30 is provided in the end cap 16. Adjustment of the size of this hole is made by turning the flattened screw 31. This screw 31 is, in effect, an adjustable bleeder valve and is adapted to control the speed of the actual engagement of the clutch as is more fully described later. The end cap 15 carries a bracket 32 having a hole 33 which is adapted to take a supporting pin which is secured to the frame of the vehicle as generally indicated at 1 in Fig. 1.

A modified form of relief valve for the cylinder C is illustrated in Figs. 4 and 5. In this construction the outer end of the valve stem 34 is threaded for the adjusting nut 35. The hole in the bracket 21 through which the valve stem 34 passes is enlarged to accommodate the coil spring 36. This spring 36 tends to maintain the valve member 37 in closed position as illustrated in Fig. 5. A very light spring is preferably used for this purpose so that when the piston 2 moves to the left (Fig. 4) the valve 37 will be unseated and air will be permitted to enter the cylinder C through the port 38 thus permitting free movement of the piston in the clutch disengaging direction as will be more fully explained later.

The accelerator, which is generally indicated at 7 in Fig. 1, comprises a button shaped head 39 and a tubular shank portion 40. A disc 41 is secured to the end of the tube 40 opposite the button 39. The valve housing 42 is bored to accommodate and form a support bearing portion for the tube 40. This housing 42 carries a threaded extension 43 which is adapted to extend through a hole 44 in the floor board 45 of the vehicle. The valve V and the accelerator assembly may be held in position by the nut 46 which serves to clamp the valve housing to the floor board. A coil spring 47 surrounds the tube 40 and has its end abutting against the upper end of the extension 43 of the valve housing 42 and its other end against the under side of the button 39. This spring is in compression and tends to hold the button 39 at its greatest distance from the floor board. The rod 8 carries an enlarged flank portion 48 and has its upper end 49 extending into the tubular shank 40 of the accelerator. The opposite end of the rod 8 may be connected either directly or through suitable linkage to the throttle valve operating arm 50 of the carburetor. The spring 12 tends to maintain the throttle in its closed or idling speed position with the throttle arm 50 against the adjustable stop screw 51. The positions which the parts of the above described accelerator assembly assume when the operator's foot is completely removed from the button 39 are illustrated in Fig. 6. Referring to this figure it will be seen that the throttle arm 50 is against the stop 51 and that the button 39 and the tubular shank 40 have been moved to their limit of movement by the spring 47. The above described telescoping foot accelerator construction permits the hand accelerator to be operated without moving the foot accelerator or the valve V.

When the throttle control assembly is in the position shown in Fig. 6 the parts of the vacuum controlling valve V are in the positions shown in Fig. 9 and the conduit 9 is connected to the tubular opening in the valve housing 52 through the port 53. In like manner the conduit 6 is connected to the interior of the valve housing through the port 54. This valve V is of the piston type in which the piston P is slidable in the housing 52 to open and close the different valve ports. The piston P is made up of two connected end portions 55 and 56 which are connected together by a rod 57 of smaller diameter than the ends 55 and 56. As seen in Figs. 9 and 10, the end 56 of the piston P is cup-shaped and contains a spring 58 which tends to hold the piston P in its farthest left position (Fig. 10). In Fig. 9 the piston P is in its farthest right position (the same as in Fig. 6) and the conduit 9 is connected through the space around the connecting rod 57 to the conduit 6 and the cylinder C is subjected to the influence of the vacuum of the intake manifold. The end portion 55 of the piston P seals the vent 59 from the atmosphere when the valve is in this position. The size of the opening to the atmosphere may be controlled by the adjusting screw 60 which determines the effective size of the vent 59. The spring 47 which surrounds the tubular accelerator rod 40 need be only strong enough to overcome the spring 58 which tends to maintain the valve V in the position shown in Fig. 10.

A small hole 52' is preferably provided to connect the inner end of the bore of the valve housing 52 to atmosphere. This balances the pressure on the ends of piston P and eliminates any tendency for the action of the intake suction to shift the position of the valve. If desired, grooves 52'' may be provided in the end of the housing casting leading from the center bore to the edge of the housing so that passages will be formed thereby when the valve is clamped to the floor board. These passages will serve the same purpose as the hole 52'.

When the piston P is in the position shown in Fig. 10 the conduit 6 leading to the cylinder C is connected to the atmosphere through the vent 59 and the port 53 which connects to the intake manifold is closed by the piston valve member 56. A small screw 61 is threaded into the valve casing 52 and has its lower end extending into a slot 62 in the end portion 55 of the piston P. This pin and slot arrangement limits the movement of the piston P as is clearly seen from Figs. 9 and 10.

The shut-off valve 10 is illustrated in detail in Figs. 11, 12, 13 and 14 and as shown in a three-way type of valve. When the operating arm 63 is in the position shown in Fig. 11, the parts are in a position shown in Fig. 12 and the conduit 9 is connected to the interior of the manifold M through the hole 64 in the rotatable closure member 65. A recess 66 is provided on the side of the closure member 65 and when the closure member is turned until the arm 63 strikes the stop 67, this recess connects the conduit 9 to the atmosphere through the vent hole 68 in the housing of the valve. When the valve is in this position the hole 64 is blocked off and there is no connection between the conduit 9 and the manifold M. By providing the recess 66 which connects the conduit 9 to the atmosphere when it is shut off from the manifold M the clutch may be operated by the driver's foot in the usual manner without any appreciable additional resistance or interference from the vacuum cylinder C and its co-operating piston 2.

The operation of the vehicle, assuming that the valve 10 is in the position shown in Figs. 11, 12 and 13, in which the conduit 9 is connected to the manifold M of the engine and the other parts of the apparatus in the positions shown in Fig. 1, is as follows:

To start the car the operator moves the gear shift lever into the desired gear, for example, low speed. He can do this without effort as the clutch is maintained in a disengaged position by the vacuum cylinder C. When the operator's foot is completely removed from the accelerator button 39 the vacuum in the intake manifold is connected through the valve V to the lower end of the cylinder C thus pulling the piston 2 downwardly and disengaging the clutch. The next operation is for the driver to place his foot on the accelerator button and push it downwardly. During the first part (a relatively short distance, for example, about one-quarter inch) of the downward movement of the accelerator the tube 40 merely telescopes over the upper end of the connecting rod 8. This telescoping continues until the flange 41 strikes the flange 48. This initial movement of the tubular rod 40 permits the position of the valve V to be changed from that shown in Fig. 9 to that shown in Fig. 10. This occurs because the spring 58 always tends to move the valve closure member P to the position in which the cylinder C is connected to the atmosphere. Further downward movement of the accelerator opens the butterfly valve of the carburetor through the connecting rod 8 and accelerates the engine. Thus when the operator pushes on the foot throttle button, after having shifted into low gear, the clutch is first started into engagement by connecting the cylinder C to the atmosphere. This permits the clutch springs to cause the clutch to engage in a gradual and proper manner as will be more fully explained later.

The driver now accelerates the engine and after having obtained the desired speed in low gear he completely removes his foot from the accelerator button 39. This action causes the engine to slow down to idle speed and the last part of the movement of the tubular rod 40 causes the flange 41 to engage the end of the piston valve member P and move it inwardly to the position shown in Fig. 9 in which the intake manifold suction is directly connected to the lower end of the cylinder C. The action of the suction causes the piston 2 to move downwardly in the cylinder C and quickly and positively disengage the clutch. The next operation of the driver is shifting the gear shift lever into the next speed. This may be done without clashing as the clutch is at this time completely disengaged. Now the operator again pushes down on the accelerator and the initial movement causes the clutch to engage as above explained and further movement will accelerate the engine to any desired speed.

Whenever it is desired to come to a complete stop the driver need merely remove his foot from the accelerator button and apply the brake. It is unnecessary to always move the gear shift lever into neutral position as it will be understood that whenever the foot is completely removed from the accelerator the clutch will be disengaged by the action of the intake manifold suction. By providing the relatively short movement or lost motion at the beginning of the downward travel of the tubular member 40 and its disc 41 before it strikes the shoulder 48 and starts to open the throttle, the clutch always starts to engage before the throttle starts to open and conversely the throttle is always completely closed before the clutch is disengaged. This greatly assists in the most efficient and economical operation of the vehicle.

With our apparatus it is possible for the operator to cause the vehicle to coast or "free wheel" whenever desired. For example, if the car is travelling along at a good rate of speed and the driver wishes to coast or if the driver wishes to economize on fuel while coasting down hill he need only completely remove his foot from the accelerator button. This action causes the engine speed to be reduced to its lowest value and the clutch to be immediately and completely disengaged. When the driver wishes to again apply the power he pushes down on the accelerator which causes the clutch to be properly engaged and at the same time operates the throttle to give the desired engine speed.

Whenever the disc 41 is moved from its position as shown in Fig. 6 until it strikes the shoulder 48 the valve V will change its position from that shown in Fig. 9 to that shown in Fig. 10. When the valve reaches the position shown in Fig. 10 the action of the clutch springs will cause the clutch to be engaged. The engagement of the clutch will be controlled by the escape of air from the right hand end of the cylinder (Figs. 2, 3, 4 and 5), as this factor will control the movement of the piston 2 and through the connecting rod 3 the engagement of the clutch.

In the form of our invention shown in Figs. 2 and 3 there will be comparatively little resistance to movement of the piston 2 in the clutch engaging direction until the piston strikes the coil spring 26 which will close the check valve 23. This spring 26 may be made and adjusted in accordance with the particular clutch with which the apparatus is used so that the valve 23 will be closed at approximately the point in the travel of the piston 2 and the clutch lever 4 where the actual engagement of the clutch begins to take place. From this point on the movement of the piston 2 will be relatively slow as the only escape for air is now through the small adjustable opening 30. During this latter portion of the piston travel the clutch will be gradually engaged and, by adjusting the screw 31, this final engaging action may be controlled to suit the operator and to fit the particular clutch with which the apparatus is to be used. Free movement of the piston 2 in the opposite direction (to the left in the drawings) will not be interfered with as the spring 26 may be so light and flexible that as soon as the piston 2 starts to move to the left the valve 23 will be lifted from its seat by the reduction of pressure in the cylinder and there will be a free flow of air into the cylinder through the valve opening.

In the modified form of cylinder check valve construction illustrated in Figs. 4 and 5 the action is substantially the same as that above described. In this case the valve 37 is normally held closed by the spring 36. Thus when the piston 2 starts to move to the right to permit the clutch to engage the only escape of air will be through the small vent hole 30. However, the initial movement of the piston 2 will be relatively fast and will be gradually slowed down as the air is compressed in the cylinder. This compressing action takes place because the air is not able to escape rapidly enough through the hole 30.

It has been found that, by proper adjustment of the screw 31 and proper proportioning of the parts, the movement of the piston 2 during the engaging action of the clutch may be so controlled that it is relatively rapid up to the point where the actual engaging of the clutch begins and from this point on is relatively slow and gradual to secure the desired smooth and non-grabbing clutch action. This construction also permits free movement of the piston in the disengaging operation because the spring 36 is so light that any movement of the piston to the left will unseat the valve 37 and permit air to be drawn in through the port 38.

Free movement of the piston in the clutch disengaging direction (to the left in Figs. 2, 3, 4 and 5), which is particularly desired when the manifold M is shut off from the cylinder by the valve 10, is assured both by the connection to the atmosphere through the hole 68 in the valve 10 and by the construction of the piston 2. This piston 2 is of the well known type used frequently in bicycle and automobile tire pumps. When pressure is applied on the open side of the cup-shaped leather washer 28 it is pressed outwardly against the cylinder wall and forms a tight seal. However, if pressure tends to build up on the other side of the piston (left hand end in the drawings) the air will pass freely around the disc 27 and the washer 28 and it will be seen that there will not be any appreciable resistance to movement of the piston in the clutch disengaging direction.

When it is desired to disconnect our automatic clutch control mechanism the driver pulls upwardly on the rod 11 thus moving the valve 10 from the position shown in Figs. 1, 11, 12 and 13 to that shown in Fig. 14. This shuts off the manifold M from the conduit 9, which leads to the valve V, and connects the conduit 9 to the atmosphere through the opening 68. It will be seen that, with this connection to the atmosphere, the lower end of the cylinder C will always be connected to atmosphere when the valve 10 is in the "off position" (Fig. 14), regardless of the position of the valve V. Thus the co-acting operation of the throttle control and the clutch will be destroyed and the operation of the vehicle will be the same, in so far as the movements of the driver necessary to control the vehicle are concerned, as though our control apparatus were not installed thereon. There will be, however, an improved clutch engaging action as the cylinder C will now act as a dash pot to govern and control the engagement of the clutch regardless of how quickly the operator may remove his foot from the pedal. This action is of distinct advantage as the clutch will always be properly engaged irrespective of the inexperience or improper action of the driver.

From the above description of a preferred form of our apparatus and of the ordinary operation thereof it will be seen by those skilled in the art that we have provided means for greatly simplifying the operation of a motor vehicle. Although we have shown and described one form of our invention in considerable detail it will be understood by those skilled in the art that modifications and variations thereof may be made without departing from the spirit of our invention and we do not, therefore, limit ourselves to the precise details shown and described but claim as our invention all embodiments thereof coming within the scope of the appended claims.

We claim:

1. In apparatus of the class described the combination of a cylinder, a piston in said cylinder, a valve at one end of said cylinder, said valve being adapted to freely open to permit inflow of air to the cylinder when said piston is moved in a direction away from said valve, a resilient member secured to said valve and extending into said cylinder in a direction substantially parallel to the longitudinal axis of said cylinder, said resilient member being adapted to be engaged by said piston to close said valve.

2. In apparatus of the class described, a cylinder, a piston in said cylinder, a valve disposed at one end of said cylinder and resilient means secured to said valve and extending into said cylinder, said resilient means being adapted to be engaged by said piston to close said valve while offering very small resistance to the movement of said piston toward said valve.

FREDERICK G. FOLBERTH.
WILLIAM M. FOLBERTH.